United States Patent
Briere et al.

[11] Patent Number: 5,968,560
[45] Date of Patent: Oct. 19, 1999

[54] BLOW MOLDING DEVICE FOR PRODUCING THERMOPLASTIC CONTAINERS

[75] Inventors: Dominique Briere, Le Havre; Léon Coisy, Saint Martin du Manoir; Paul La Barre, Sainte Adresse; Pascal Santais, Le Havre, all of France

[73] Assignee: Sidel, Le Havre, France

[21] Appl. No.: 08/945,089

[22] PCT Filed: Apr. 16, 1996

[86] PCT No.: PCT/FR96/00576

§ 371 Date: Oct. 17, 1997

§ 102(e) Date: Oct. 17, 1997

[87] PCT Pub. No.: WO96/33059

PCT Pub. Date: Oct. 24, 1996

[30] Foreign Application Priority Data

Apr. 19, 1995 [FR] France .................................. 95 04651

[51] Int. Cl.⁶ .............................. B29C 49/56; B29C 33/30
[52] U.S. Cl. ..................... 425/192 R; 425/195; 425/522; 425/541; 249/102
[58] Field of Search ............... 425/183, 192 R, 425/195, 522, 541; 249/102

[56] References Cited

U.S. PATENT DOCUMENTS

| | | | |
|---|---|---|---|
| 467,881 | 1/1892 | Fisher | 249/102 |
| 1,409,591 | 3/1922 | Schavoir | 249/102 |
| 3,191,225 | 6/1965 | Polka | 425/541 |
| 3,753,641 | 8/1973 | Turner et al. | 425/541 |
| 3,784,344 | 1/1974 | Korsch | 425/526 |
| 3,871,611 | 3/1975 | Taketa | 249/102 |
| 4,072,456 | 2/1978 | Appel et al. | 425/183 |
| 5,262,116 | 11/1993 | Von Holdt, Sr. | 425/192 R |
| 5,288,222 | 2/1994 | Wieser | 425/192 R |
| 5,332,384 | 7/1994 | Abramat | 425/522 |
| 5,346,386 | 9/1994 | Albrecht et al. | 425/541 |
| 5,358,396 | 10/1994 | Giesen | 425/192 R |

FOREIGN PATENT DOCUMENTS

| | | | |
|---|---|---|---|
| 2057196 | 5/1971 | France | 249/102 |
| 2613979 | 10/1988 | France | . |
| 2646802 | 11/1990 | France | . |
| 2653058 | 4/1991 | France | 425/522 |
| 3613543 | 12/1986 | Germany | . |
| 3934495 | 12/1990 | Germany | . |

OTHER PUBLICATIONS

"Quick–change systems add to blow molders' market reach", by Patrick A. Toensmeier, Modern Plastics International, Aug. 1991 (pp. 30–31).

Patent Abstracts of Japan, vol. 12, No. 286 (M–727), Aug. 5, 1988, (Abstract of Japanese reference 63–062,710 dated Mar. 19, 1988).

*Primary Examiner*—Robert Davis
*Attorney, Agent, or Firm*—Sughrue, Mion, Zinn, Macpeak & Seas, PLLC

[57] ABSTRACT

The invention concerns a device for producing thermoplastic containers, in particular bottles, by the blow-molding or stretch blow-molding of a preheated preform. The device comprises at least one mould consisting of two half-molds (2) each supported by a mould carrier, the two mould carriers being movable relative to each other. Each half-mould (2) comprises a shell holder (9), supported by the respective mould carrier, and a shell (7) which is equipped with a half-impression (8) of the container to be obtained and can be rendered integral in a detachable manner with its shell holder (9) by rapid-fastening means (19–23). The shell (7) and the shell holder (9) are of complementary shapes such that they contact each other at least partially for heat conduction purposes whilst the pipes and connections for circulating and/or heating fluids are provided in the shell holder alone.

14 Claims, 3 Drawing Sheets

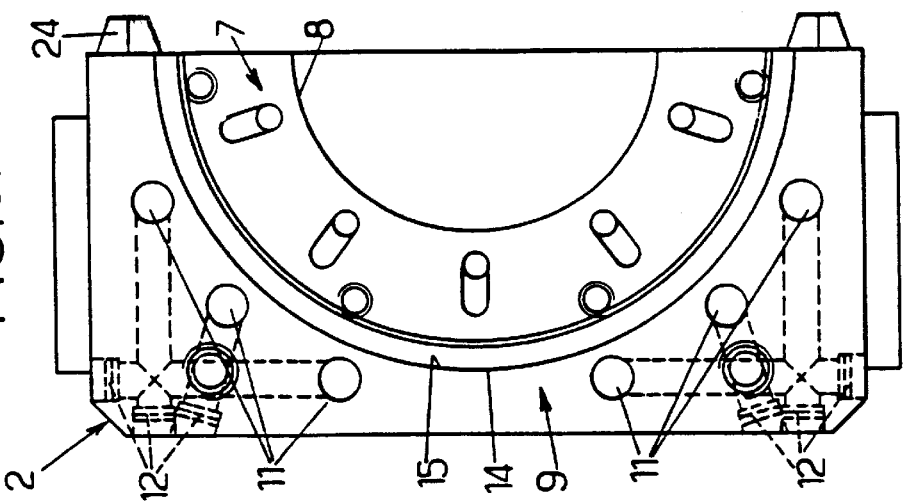
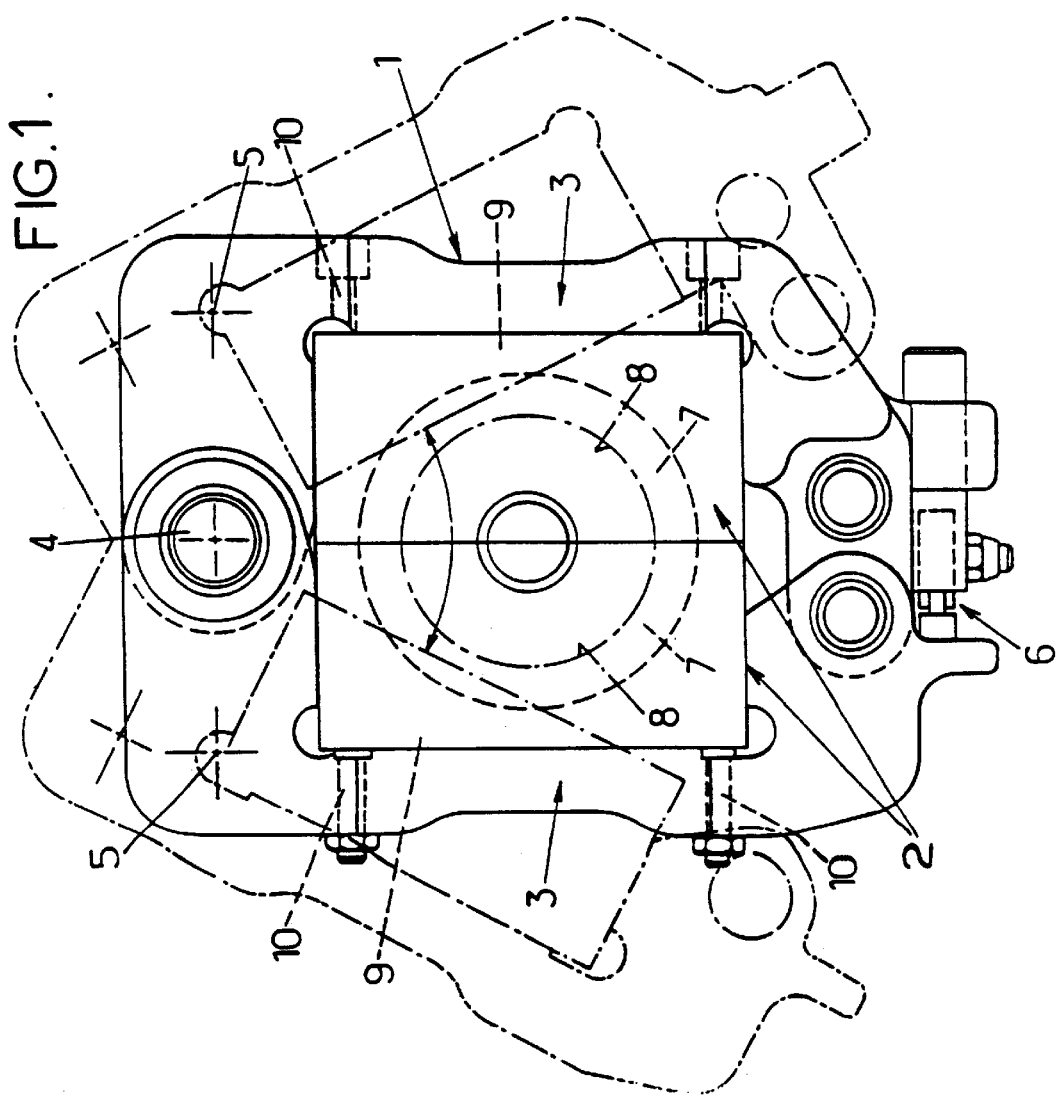

BLOW MOLDING DEVICE FOR PRODUCING THERMOPLASTIC CONTAINERS

The present invention relates to improvements made to devices making it possible to manufacture containers, in particular bottles, made of a thermoplastic by blow molding or stretch-blow molding of a preheated preform, the said device including at least one mold consisting of two half-molds respectively supported by two mold carriers which can move one with respect to the other.

It is common practice for the half-molds to be removably fixed to the respective mold carriers so that the said half-molds can be replaced or changed should they become damaged and/or worn and, above all, should containers of different shapes and/or sizes be manufactured, without it being necessary to replace the entire molding device.

However, such an arrangement is still far from being to the complete satisfaction of users. This is because each half-mold is heavy (for example about 25 to 30 kg for a steel mold): the fixing means must be able to support this weight and comprise many nut-and-bolt and/or screw connections; furthermore, each half-mold must be handled by several people and/or by means of a hoist, thereby requiring a suitable installation above the manufacturing device. Each half-mold is equipped with means for the circulation of one or more fluids for the cooling and/or heating of the walls of the impression: replacing each half-mold is accompanied by disconnecting, followed by reconnecting, of the corresponding fluid connections, all operations requiring time.

It is also necessary to add an economic consideration regarding the actual construction of each half-mold. The impression serving for pressure molding the final container must have a perfectly polished surface finish, to which, furthermore, the hot thermoplastic must not adhere: it is therefore necessary for the impression to be made of a suitable metallic material (for example stainless steel) which, moreover, may differ depending on the thermoplastic employed. Given the monobloc structure of the half-mold, it is therefore the totality of each half-mold which must be made of this suitable metallic material, this being a special and therefore expensive material, while the rear part of the half-molds merely fulfills a mechanical strength function, giving the mold rigidity and non-deformability, for which rear part a more ordinary, and therefore less expensive, material could be perfectly suitable.

The object of the invention is therefore essentially to remedy, as far as is possible, the drawbacks of the currently known manufacturing devices and to provide an improved device which allows quick and simple changing of the molding impressions in order to make it easier to adapt the device to the manufacture of various containers, and the improved structure of which device is, at the end of the day, less expensive than that of the current devices while still maintaining the same strength and non-deformability properties.

To these ends, a device for manufacturing thermoplastic containers, as mentioned in the preamble, is essentially characterized, being designed in accordance with the invention, in that each half-mold comprises a shell holder supported by the respective mold carrier and a shell which is provided with a half-impression of the container to be obtained and which can be removably fastened to its shell holder by quick-fixing means, the shell and the shell holder being of complementary shapes in order to be in at least partial mutual contact, with thermal conduction, while the pipes and connections for the circulation of cooling and/or heating fluids, and optionally the members for guiding the half-molds in order to close the mold, as well as the pressure-compensating means for maintaining the sealed closure of the mold during blow molding, are provided exclusively in the shell holder.

By virtue of this arrangement, the part of the half-mold corresponding to the impression, which may be economically made of a suitable and relatively expensive material, and the rear part of the half-mold, which provides rigidity and mechanical strength and which may be made of a more ordinary and less expensive material (for example a standard aluminum alloy), are separated from each other. In addition, being less heavy, this rear part has less inertia, thereby contributing to facilitating the rotational movements of the half-molds. In addition, and above all, changing the impression in order to manufacture containers of various shapes merely requires changing the shell, which is of a much lower weight (for example about 10 kg) compared to the complete half-mold and which can therefore be handled manually: the handling installation (which, however, remains necessary in order to handle other components, and in particular the shell holders, of the device) may, however, be simplified and, above all, the procedure for replacing the shells is speeded up. This procedure is, furthermore, made even more rapid as there are no longer the fluid fittings to be disconnected, and then reconnected, these remaining permanently connected to the shell holders.

It is also possible to standardize the shell holders which are, from the outset, equipped with a number of fluid pipes from among which those useful for a given manufacture with a given impression may be selected. Thus, it is possible to create independent circuits making it possible to produce, in each shell holder and therefore in the shell, regions with differentiated temperature settings. Here again, this results in the possibility of reducing the manufacturing cost of the shell holders, which accompanies their standardized production in larger number.

Preferably, the mutually contacting mating faces of the shell and of the shell holder are approximately semicylindrical surfaces of revolution with an axis approximately parallel to the axis of the impression of the container to be manufactured; it is thus easier to produce mutually-contacting mating faces which ensure heat transfer as close as possible to that of a monobloc structure, something which may furthermore be obtained by providing for the shell and the shell holder to be in total thermal-conduction contact. However, it should be noted here that the arrangement according to the invention also provides the possibility of ensuring, when this proves to be desirable, that the shell and the shell holder are in partial thermal-conduction contact by leaving regions of limited thermal conduction, which also constitutes another means of creating, in the wall of the impression, regions with differentiated temperature settings.

It is desirable, in order to allow quick, and therefore easy, assembly of the shell on the shell holder, while still having precise relative positioning of the shells one with respect to the other, for the mutually-contacting mating faces, with thermal conduction, of the shell and of the shell holder to be provided with axial mutual-positioning means; preferably, the said axial mutual-positioning means comprise a system of one or more mating ribs and grooves extending circumferentially, which arrangement, in combination with the aforementioned semicylindrical configuration of the said mating faces of the Shell and of the shell holder, allows very simple assembly, with very precise positioning of the shell, using simplified fixing means.

Thus, advantageously, the means for quickly fixing the shell to the shell holder are provided on their respective parting faces. In the case of semicylindrical mating faces, the said fixing means are located on the respective edges of the shell and of the half-shell, these being parallel to the axis of the impression; it is then desirable for the quick-fixing means to comprise, on one side, at least one stop for positioning the parting face of the shell with respect to the parting face of the shell holder and, on the other side, quick-screwing means on the parting face of the shell holder with a clamping surface projecting from the parting face of the shell, by virtue of which the shell is put into place on and locked onto the shell holder by curvilinear sliding of the shell, guided by the rib(s)/groove(s) system, in the cradle formed by the shell holder. In particular, if the mold carriers are rotationally pivoted with respect to each other, in order to form a "jackknife"-type mold, provision is made, in order to simplify connection and disconnection, for the above-mentioned stop to be located on the pivot side of the mold carriers and the quick-screwing means to be located on the opposite side.

In order to be more specific, it may be pointed out that, in a typical molding device designed in accordance with the invention, the time to replace a pair of shells is about 8 minutes while the time to replace a pair of half-shells in a prior device is about 20 minutes, using appropriate handling equipment.

The invention will be more clearly understood on reading the detailed description which follows of a preferred embodiment given solely by way of illustrative example. In this description, reference is made to the appended drawings in which:

FIG. 1 is a diagrammatic view from above of part of a molding device designed in accordance with the invention;

FIG. 3 is a view from below of a half-mold in FIG. 2.

Figure 2:
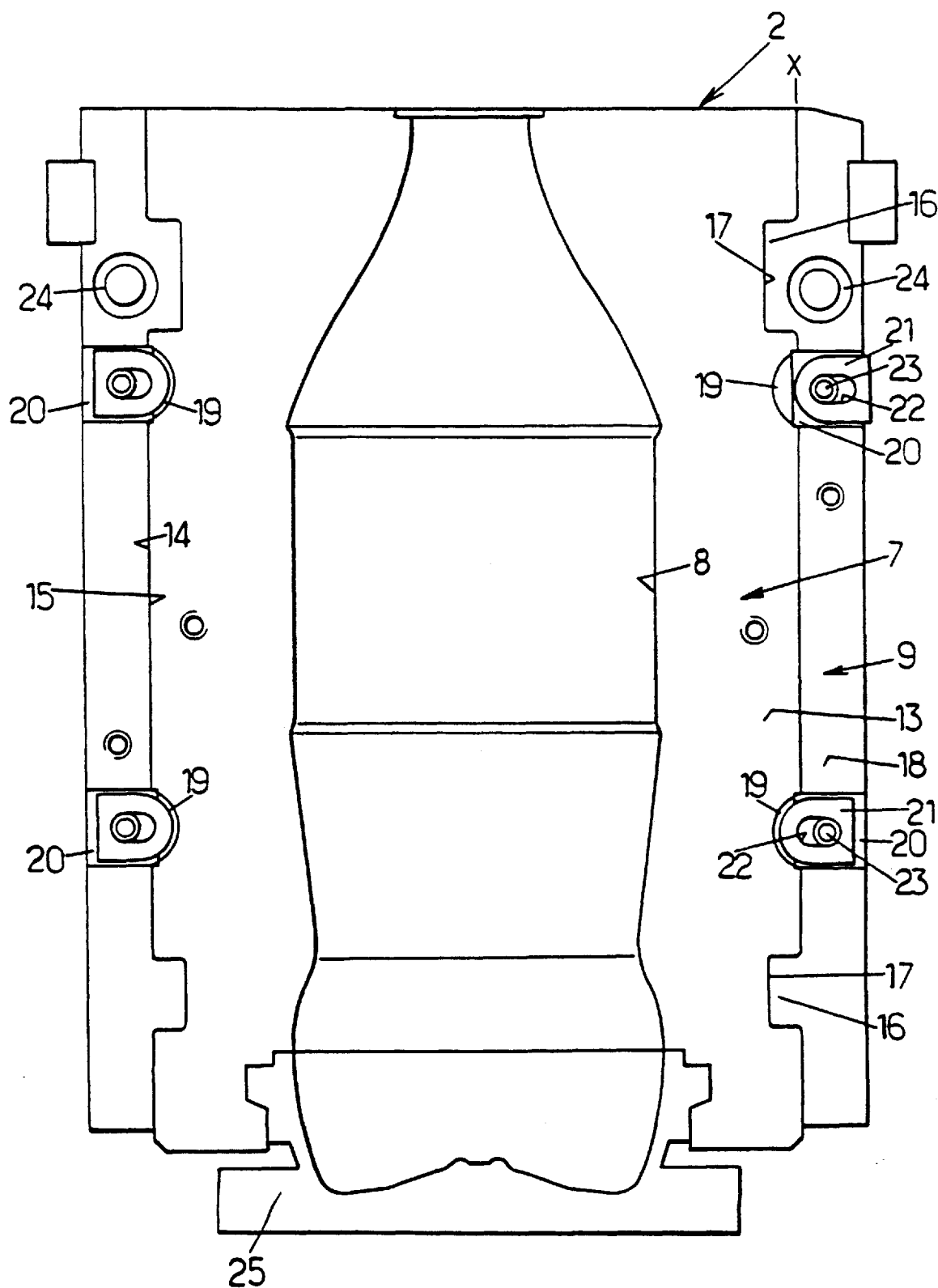
FIG. 2 is a front view of a two-piece half-mold of the device in FIG. 1.

Referring first of all to FIG. 1, this shows part of a device for manufacturing containers, in particular bottles, made of a thermoplastic such as polyethylene terephthalate PET, polyethylene apththalate PEN or another material, as well as alloys or blends thereof, by blow molding or stretch-blow molding a preheated preform.

This device includes at least one mold 1 consisting of two half-molds 2 respectively supported by two mold carriers 3 which can move one with respect to the other. In the example shown, the two mold carriers 3 are made in the form of two enveloping structures pivotally mounted on a common rotation axis 4 in such a way that the two half-molds can move apart by pivoting (a socalled "jackknife" structure). The mold carriers may be driven, in order to open and close the mold, in a conventional manner using a system of traction arms pivoted at 5 to the respective mold carriers a certain distance from the axis 4 of the latter.

Locking means, denoted in their entirety by 6, lock the two half-molds in the closed, molding position.

In accordance with the invention, each half-mold is made in the form of two subassemblies, namely a shell 7 provided with a half-impression 8 of the container to be manufactured and a shell holder 9 which supports the shell 7 and which is itself fastened to the corresponding mold carrier 2.

Each shell holder 9 may be considered as corresponding externally, in shape and size, to the mold carrier of the previous structures and it may therefore be fastened to the respective mold carrier 3 in the same manner, for example by a nut-and-bolt connection 10, it being possible for the number and disposition of the holes and internal threads to be identical to those of the previous arrangements.

As may be seen in FIG. 3, each shell holder is provided with internal pipes 11 and with fittings 12 which are necessary for the circulation of at least one fluid for cooling or heating the wall of the impression. Any number of these pipes and fittings may be provided and they may, for example, be independent of each other so as subsequently to allow them complete freedom, by externally connecting them appropriately, to constitute circuits of various and/or independent configurations depending on the type of containers to be produced and the type of material employed. Thus, it is possible to standardize to some extent the manufacture of the shell holders 9 and to reduce the manufacturing cost thereof.

Because of the fact that the impression 8 is physically separated from the shell holder 9, it is possible to make the latter from a less special material, for example an ordinary aluminum alloy, even when the shell is made of steel, thereby making it possible, here too, to reduce its cost; in addition, the shell holder 9 thus produced is lighter than a steel shell holder, which desirably decreases its inertia and has a favorable effect on the dynamic operation of the mold.

Each shell 7 has a half-impression 8 of the final container, hollowed out in its parting face 13. The external face 14 of each shell 7 has the general shape of a semicylinder of revolution, the axis of which is approximately parallel to the axis of the impression 8 of the container; in practice, the impression is coaxial with the semicylinder. The shell 7 rests in a cradle 15 of complementary shape cut out in the shell holder 9. The shapes of the shell and shell holder are perfectly matched and they are thus in as close a contact as possible. Provision may thus be made for the mating faces 14 and 15 of the shell 7 and of the shell holder 9 to be in complete thermal-conduction contact so that heat transfer from one to the other is as good as possible and approaches as far as possible that of a monobloc half-mold.

However, it is also conceivable for the said mating faces 14 and 15 to be only partially in thermal-conduction contact, with provision of regions of limited thermal conduction; it is thus possible to produce differentiated temperature settings in the wall of the impression. In order for the impression 8 to have the required polished finish and for the hot thermoplastic not to adhere to its surface, the shells are made from a suitable material, for example stainless steel. In order for the shapes of the mating parts of the shell holder 9 and the shell 7 to remain perfectly matched, it is necessary to choose materials exhibiting thermal expansion coefficients which are substantially identical.

In the example shown in FIG. 2, the container to be produced has a bottom of complex shape (petaloid bottom) and the requirements for demolding the container after it has been formed result in the provision of a separate mold bottom 25, distinct from the half-molds 2, which includes the impression of the bottom of the container. It will be noted here that FIG. 3 is a view from below of the half-mold in FIG. 2, the mold bottom 25 not being shown.

The axial mutual positioning of the shell holder 9 and of the shell 7 is achieved by a rib(s)/groove(s) set of mating elements which fit together, one in the other. As shown in FIG. 2, the shell 7 is provided with two grooves 17, hollowed out circumferentially in its external face 14 axially separated from each other; likewise, the cradle-shaped face 15 of the shell holder 9 has two ribs 16 which fit together without any clearance in the two respective grooves 17. Once the shell 7 has been placed in the shell holder 9, it can no longer move axially with respect to the latter but can only slide rotationally about its axis on the cradle 15.

In order fully to lock the shell onto the shell holder, quick-fixing means are provided in the parting face 13 of the shell and in the parting face 18 of the shell holder. For this purpose, respective housings 19 and 20, hollowed out in the facing edges of the afore-mentioned parting faces 13 and 18, respectively, are provided. The bottoms of the housings 19 of the shell 7 constitute flat bearing surfaces on which may bear members for locking the shell holder 9. These locking members may be formed in many ways known to those skilled in the art. In the example shown in FIG. 2, these are projecting lugs 21 drilled with an elongate hole 22 and retained by a screw 23 fixed to the bottom of the corresponding housing 20 of the parting face 18 of the shell holder 9; this arrangement has the advantage that the shell is released as soon as the lugs 21 are unlocked and pushed back toward the outside, without it being necessary to remove the screws 23 completely. Notwithstanding this, the shell could also be locked onto the shell holder by using wide-head screws overlapping the flats of the housings 19, or else by using quick-face eccentric-head screws, etc.

It will be noted that in practice the two locking members 21 located on the side adjacent to the axis of rotation 4, in the case of a jackknife mold, do not have to be actuated and may thus constitute simple stops (with the possibility of adjusting the position of these stops) under which the flats of the respective housings 19 are brought when the shell is inserted into the shell holder, by causing the shell to slide rotationally in the latter. Moreover, given the position of these two locking members 21 located in the bottom of the open mold, their access is difficult and their removal would unnecessarily lengthen the process of replacing the shell 7.

Figure 4:
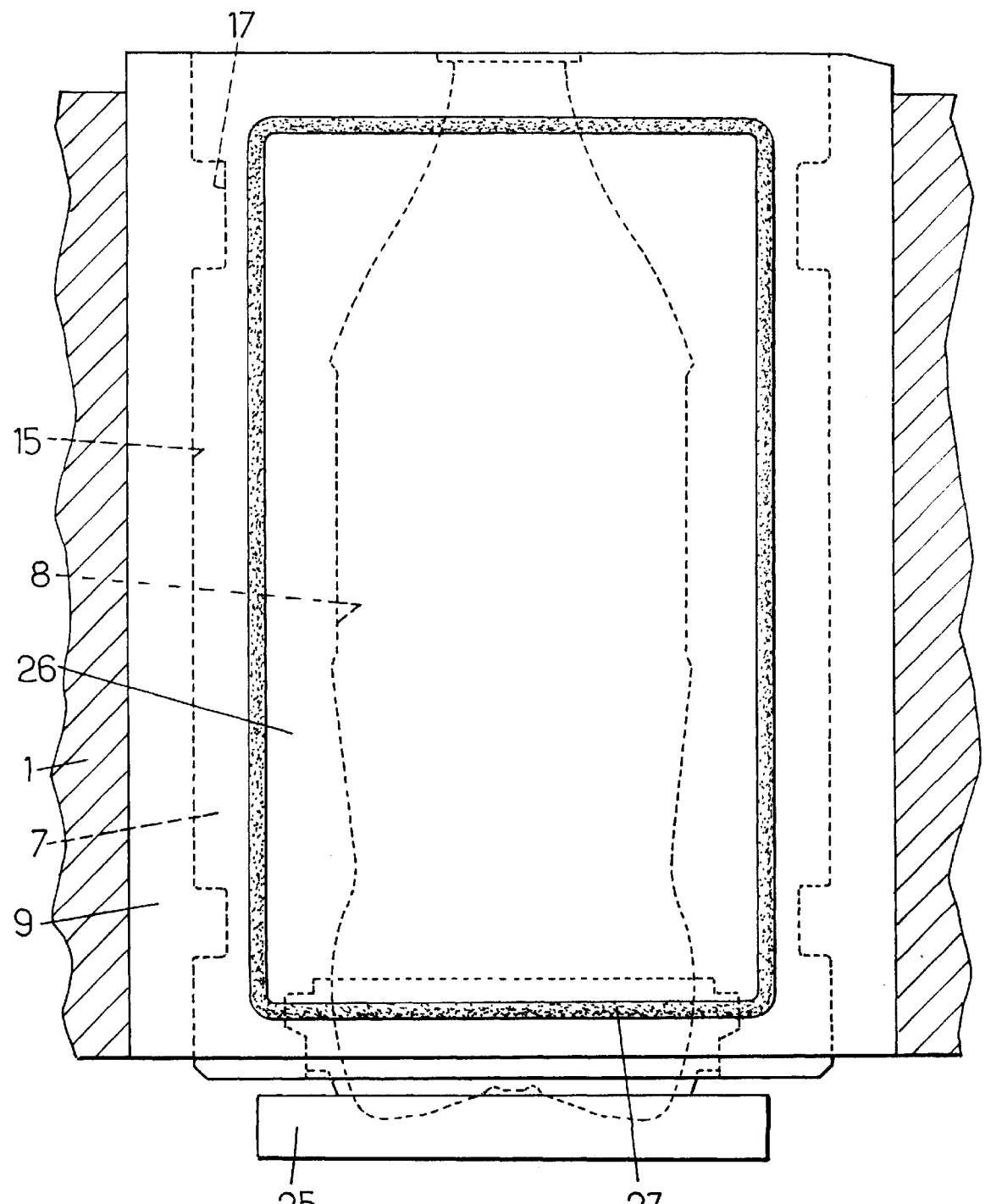
FIG. 4 is a view from left, partially cutaway, of the device of FIG. 1.

As for the rest, each shell holder 9 is designed in the same way as a previous half-mold, which includes the elements necessary for correct operation of the molding device, and in particular the means 10 for fixing it to the corresponding mold carrier 3, the guiding fingers 24 (and the respective housings in the other shell holder) for closing the mold, the rear face provided with a chamber 26 and with an O-ring seal 27 for compensation as shown in FIG. 4. It is therefore possible, in a preexisting installation, to replace the conventional monobloc half-molds with two-element half-molds according to the invention.

Needless to say, and as results already from the foregoing, the invention is in no way limited to those of its methods of application and of its embodiments which have been more particularly envisaged; on the contrary, it embraces all variants thereof.

We claim:

1. Device for manufacturing containers, made of a thermoplastic by blow molding or stretch-blow molding of a preheated preform, the said device including at least one mold (1) consisting of two half-molds (2) respectively supported by two mold carriers (3) which are made in the form of enveloping structures and which can move one with respect to the other, characterized in that each half-mold (2) comprises a shell holder (9) supported by the respective mold carrier (3) and a shell (7) which is provided with a half-impression (8) of the container to be obtained and which can be removably fastened to its shell holder (9) by quick-fixing means (19–23), the shell (7) and the shell holder (9) being in complementary shapes in order to be in at least partial mutual thermal-conduction contact while the pipes and connections for the circulation of cooling and/or heating fluids (11, 12) are provided exclusively in the shell holder.

2. Device according to claim 1, characterized in that the mating faces (14, 15) of the shell (7) and of the shell holder (9) are in total thermal-conduction contact.

3. Device according to claim 1, characterized in that the mating faces (14, 15) of the shell (7) and of the shell holder (9) are in partial thermal-conduction contact by leaving regions of limited thermal conduction.

4. Device according to claim 1, characterized in that the mutually contacting mating faces (14, 15) of the shell (7) and of the shell holder (9) are approximately semicylindrical surfaces of revolution with an axis approximately parallel to the axis of the impression (8) of the container to be manufactured.

5. Device according to claim 1, characterized in that the mutually contacting mating faces (14, 15) of the shell and of the shell holder are provided with axial mutual-positioning means (16, 17).

6. Device according to claim 5, characterized in that the axial mutual-positioning means comprise a system of one or more mating ribs (16) and grooves (17) extending circumferentially.

7. Device according to claim 1, characterized in that the means (19–23) for quickly fixing the shell (7) to the shell holder (9) are provided on their respective parting faces (13, 18).

8. Device according to Claim 4, characterized in that the means (19–23) for quickly fixing the shell and the shell holder are located on their respective edges parallel to the axis of the impression.

9. Device according to claim 8, characterized in that the quick-fixing means (19–23) comprise, on one side, at least one stop for positioning the parting face of the shell with respect to the parting face of the shell holder and, on the other side, quick-screwing means (23) on the parting face (18) of the shell holder (9) with a clamping surface (21) projecting from the parting face (19) of the shell.

10. Device according to claim 9, in which the mold carriers are rotationally pivoted with respect to each other whereby at least one stop is located on the pivot (4) side of the mold carriers (3) and the quick-screwing means are located on the opposite side.

11. Device according to claim 1, characterized in that the shell holder (9) is also provided with members (24) for guiding the half-molds in order to close the mold.

12. Device according to claim 1, characterized in that at least one of the shell holders is equipped with pressure-compensating means suitable for maintaining the sealed closure of the mold during blow molding.

13. Device according to claim 1, characterized in that the shell holders (9) are equipped with a number of fluid pipes, by virtue of which it is possible to create suitable circuits for a given manufacture with a given impression.

14. Device according to claim 1, wherein said containers are bottles.

* * * * *